(12) United States Patent
Aglietti et al.

(10) Patent No.: US 6,578,065 B1
(45) Date of Patent: Jun. 10, 2003

(54) MULTI-THREADED PROCESSING SYSTEM AND METHOD FOR SCHEDULING THE EXECUTION OF THREADS BASED ON DATA RECEIVED FROM A CACHE MEMORY

(75) Inventors: Robert Aglietti, San Jose, CA (US); Tomas G. Rokicki, Palo Alto, CA (US); Rajiv Gupta, Los Altos, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/405,441

(22) Filed: Sep. 23, 1999

(51) Int. Cl.[7] ............... G06F 9/00; G06F 12/00; G06F 12/14; G06F 12/16; G06F 13/00
(52) U.S. Cl. ............... 709/104; 711/3; 711/133; 711/141; 707/141; 707/142; 707/143; 707/144; 707/145; 707/146; 709/102; 709/105; 709/106
(58) Field of Search ............... 711/111, 126, 711/172; 365/230; 707/141, 142, 143, 144, 145, 146; 712/225; 709/102, 103, 104, 105, 106; 702/138; 706/12; 345/531

(56) References Cited

U.S. PATENT DOCUMENTS

| | | | | |
|---|---|---|---|---|
| 5,526,025 A | * | 6/1996 | Selwan et al. ............... 345/531 |
| 5,974,438 A | * | 10/1999 | Neufeld ............... 709/104 |
| 6,070,227 A | * | 5/2000 | Rokicki ............... 711/111 |
| 6,119,205 A | * | 9/2000 | Wicki et al. ............... 711/122 |
| 6,175,814 B1 | * | 1/2001 | Chrysos et al. ............... 702/138 |
| 6,205,519 B1 | * | 3/2001 | Aglietti et al. ............... 711/126 |
| 6,233,575 B1 | * | 5/2001 | Agrawal et al. ............... 706/12 |
| 6,269,425 B1 | * | 7/2001 | Mounes-Toussi et al. ... 711/122 |
| 6,321,328 B1 | * | 11/2001 | Karp et al. ............... 712/225 |
| 6,347,318 B1 | * | 2/2002 | Rokicki ............... 707/100 |
| 6,357,016 B1 | * | 3/2002 | Rodgers et al. ............... 711/122 |
| 6,381,676 B2 | * | 4/2002 | Aglietti et al. ............... 711/126 |
| 6,389,514 B1 | * | 5/2002 | Rokicki ............... 365/230.03 |

* cited by examiner

*Primary Examiner*—Ayaz Sheikh
*Assistant Examiner*—Christian La Forgia

(57) ABSTRACT

A system and method for controlling the scheduling of threads in a multi-thread processor system. The multi-thread processor system has a multi-thread processor, a main memory, a cache memory, and a thread scheduler. Information is sent from the cache memory to the thread scheduler for determining which thread the processor is going to execute. The thread scheduler calculates or maintains a figure of merit for each thread executing on the processor. The figure of merit determines which thread to switch to when the current or previous thread has a long latency. The figure of merit define the execution environment as measured by the performance of the cache memory. The figure of merit can be the owner of a particular thread, the number of data lines accessed by a particular thread which resides in the cache, the number of times a particular thread has hit in the cache over a specified time interval, the thread that installed the data or the thread that was used most recently.

22 Claims, 5 Drawing Sheets

MULTI-THREADED PROCESSING SYSTEM AND METHOD FOR SCHEDULING THE EXECUTION OF THREADS BASED ON DATA RECEIVED FROM A CACHE MEMORY

BACKGROUND OF THE INVENTION

1. Field of Invention

The present invention pertains to the field of computer systems. More particularly, this invention relates to thread management in a multi-threaded processor.

2. Description of the Related Art

Computer systems typically include a memory and a processor. The memory generally includes a main memory and a cache memory for storing data and instructions for the processor. Typically, the processor retrieves instructions from the memory, reads the data associated with the instructions from the memory, executes the instructions, and writes the resulting data back into the memory. The processor can be a parallel processing system using several processors, i.e., multi-processor system, to enhance the data throughput.

Accessing data and instructions from the main memory can result in periods of large latency. The latency of the memory is the delay from when the processor first requests a word from memory until that word arrives and is available for use by the processor. The latency of a memory is one attribute of performance. Accordingly, many computer systems have one or more cache memories attached to each processor to reduce the latency. For example, the computer system may include a primary cache, also known as a level one (L1) cache, which is usually tightly integrated with the processor and may be contained on the same integrated circuit as the processor. The computer system may also include a secondary cache, also known as a level two (L2) cache, which usually is located between the primary cache and the main memory in the memory hierarchy.

The cache memories store blocks of data and/or instructions that are received from the main memory. The blocks of data and/or instructions stored in the memory are generally referred to as cache lines or data lines. The cache memories usually provide the processor with relatively fast access to the data lines they contain as compared to the access time required to obtain the same data lines from the main memory.

The processor accesses information, e.g., a particular data line, in the cache memory by transmitting an address corresponding to the information to the cache memory. The cache memory searches for the address in its memory to determine whether the information is contained therein. If the information is not found in the cache memory, a cache miss occurs. When a cache miss occurs, the address is transmitted to the next level of the memory, e.g., a secondary cache memory or if one is not present, to the main memory. If a secondary cache memory is present, a search is performed on the secondary cache memory for the information; otherwise, a search operation is performed on the main memory. Once the information has been located, the information is transmitted from the main memory or the secondary cache memory to the primary cache memory. This process is referred to a cache fill operation and the information may replace other information stored in the primary cache memory.

The processor used in the computer system also can be a multi-threaded processor, which switches execution among multiple threads. A thread may be defined as a stream of addresses associated with the data and/or instructions of a particular sequence of code that has been scheduled within the processor.

One advantage of a multi-threaded processor is that it can switch threads and continue instruction execution during a long latency operation such as a cache fill operation. This usually provides an overall increase in throughput particularly when a missing data line must be obtained from the main memory.

Nevertheless, conditions might sometimes exist in the computer system having a multi-threaded processor that cause the primary cache to perform more poorly as a result of the additional demands placed on it by the additional threads. Caches have finite capacity and when one thread's data is forced out of a cache to make room for another thread's data, cache pollution occurs and the overall performance of the processor may be decreased.

It should therefore be appreciated that there remains a need for a computer system that improves the efficiency of thread scheduling. The present invention fulfills this need.

SUMMARY OF THE INVENTION

The present invention is embodied in a multi-thread processing system, and related method, that provides a multi-thread processor with information from a cache memory to control the scheduling of threads. The cache memory in the multi-thread processor may include one or more caches that may be "split", i.e. separate caches for instruction and data addresses, or "unified", i.e., a single cache which may contain both instructions as well as data lines, or a combination of the two.

The multi-thread processing system includes a multi-thread processor, a cache memory, and a thread scheduler. Initially, an address that identifies a data line to be retrieved is transmitted from the multi-thread processor to the cache memory. The cache memory performs a lookup operation to locate the address. After the address is located, a data line corresponding to the address is retrieved from the cache memory. The data line contains data and information pertaining to the data which is sent from the cache memory to the thread scheduler. The thread scheduler determines a figure of merit from the data line information for each of a plurality of threads.

The figure of merit is used by the thread scheduler to determine which thread to execute, i.e., switch to, when the current or previous thread performs a long latency operation. The figure of merit defines the execution environment as measured by the performance of the cache memory. For example, the figure of merit can be determined using one of the following criteria: the number of data lines owned by a particular thread in the cache memory, the number of times a particular thread has hit in the cache over a specified time interval, or the thread that installed the most lines into the cache memory over a specified interval. Threads having the largest figure of merit are using the processor's resources more efficiently and should be selected by the thread scheduler to execute. Accordingly, the efficiency of thread scheduling is enhanced by providing the multi-thread processor with feedback on the current execution environment as measured by the cache memory.

Other features and advantages of the present invention will be apparent from the detailed description that follows.

DESCRIPTION OF THE PREFERRED EMBODIMENT

Figure 1:
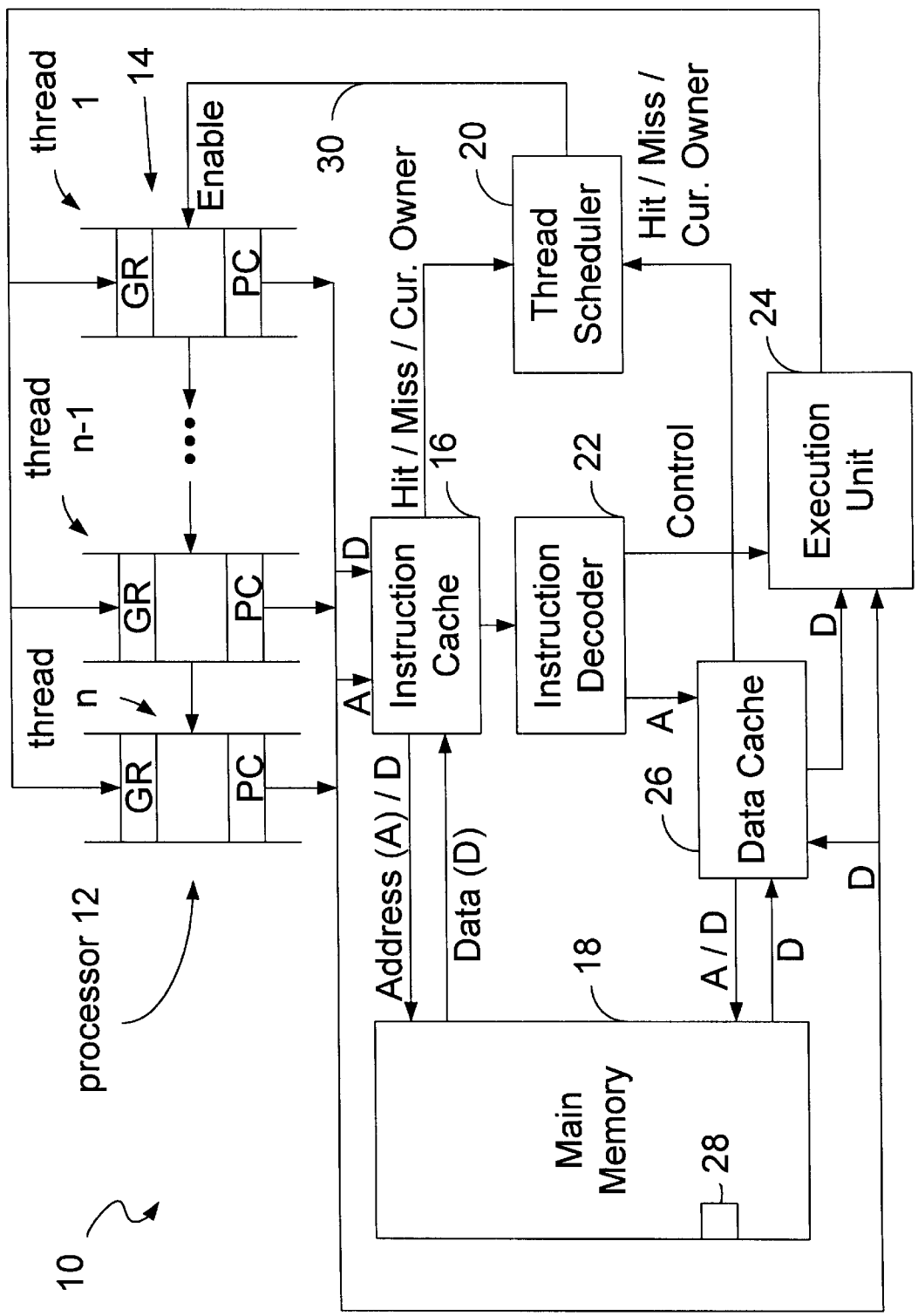
FIG. 1 is a block diagram of a multi-thread processing system having an instruction cache and a data cache.

A single threaded processor holds it's state in general registers and control registers. A multi-thread processor is a processor with multiple threads, each thread having associated with it a duplicate copy of a register file, shown in FIG. 1 as 14. With reference now to the illustrative drawings, and particularly to FIG. 1, there is shown a block diagram of a multi-thread processing system 10 having an instruction cache and a data cache. The multi-thread processing system has a multi-thread processor 12 having a duplicate register file 14 for each thread, an instruction cache 16, a main memory 18, a thread scheduler 20, an instruction decoder 22, an execution unit 24, and a data cache 26. The multi-thread processor executes instructions from one of the multiple threads based on information received from the thread scheduler. The thread scheduler improves the efficiency of thread scheduling by providing the multi-thread processor with feedback on the current execution environment as measured by the instruction cache and/or the data cache. For example, the thread scheduler receives data from a cache memory when an access occurs and it uses this information to maintain figure of merit information for the threads as execution proceeds. When a thread swapping event occurs, the thread scheduler selects a new thread to execute based on the current figure of merit information for the threads.

The instruction cache 16 receives address information corresponding to an instruction from the register file 14. The instruction cache may include a hierarchy of caches that are accessed according to the hierarchy. For example, the instruction cache may have a primary cache and a secondary cache where the instruction cache accesses the primary cache first, the secondary cache second, and a main memory 18 last. When the instruction cache receives the address, it performs a lookup operation according to the hierarchy to locate the address and determine what instruction is stored at the address.

If the instruction cache 16 finds the address in the primary cache or one of the secondary caches, a cache hit occurs and a cache hit signal is sent by the instruction cache to a thread scheduler 20. If the instruction cache 16 does not find the address in the primary cache or one of the secondary caches, a cache miss occurs and a cache miss signal is sent by the instruction cache to the thread scheduler. In either case, the owner of the line and the current thread are sent to the thread scheduler. Once the address is located, the instruction cache retrieves the instruction from the memory and the instruction is sent to an instruction decoder 22 for execution.

The instruction decoder 22 is the logic unit that reads the instruction and sends control information to an execution unit 24. The control information specifies what operation, e.g. addition, subtraction, etc., to perform on the data. If the instruction requires data from memory, the instruction decoder sends a request to a data cache 26. The data cache may have the data in its memory or may retrieve the data from a secondary memory, e.g., a secondary cache or the main memory 18, and store the data in its memory until requested by the execution unit.

The execution unit 24 receives the control information from the instruction decoder 22 and executes the command requested. For example, the control information may cause the data in GR3 to be added to the data in memory location 28 and to be stored in GR5. This control information requires the execution unit to make several data requests. In particular, the execution unit makes a request to the data cache 26 for the data located in memory location 28 and a request to the register file 14 for the data stored in GR3. The data cache retrieves the data located in memory location 28 and sends the data to the execution unit. Similarly, the data stored in GR3 is sent to the execution unit. After all of the data is received, the execution unit performs the addition operation on the data and sends the result to be stored in GR5.

To assist the thread scheduler 20 in determining when to switch to another thread, the instruction cache 16 and/or the data cache 26 send the thread scheduler information pertaining to the occurrence of cache accesses. For example, the thread scheduler 20 receives access information, e.g., a cache miss or cache hit signal, and ownership information from the instruction cache 16 and/or the data cache 26. From the access information, the thread scheduler determines whether a thread changing event has occurred, e.g., a cache miss, and whether it should enable or switch to a new thread. The occurrence of the event notifies the thread scheduler to determine which thread to select and the number of the thread to select is sent to the register file 14.

The thread scheduler 20 determines a figure of merit for the threads to determine which thread to select. The figure of merit for a thread is based on information received from the instruction cache 16 and/or the data cache 26 on each access. In one embodiment, the thread scheduler stores a figure of merit for each thread and updates this figure of merit each time a cache access occurs. Based on the hit/miss and ownership information provided by the instruction cache and/or the data cache, the thread scheduler adjusts the figure of merit up or down for each thread. In another embodiment, the figure of merit is calculated for each thread whenever a thread swapping event occurs. For example, when a cache miss occurs, the thread scheduler calculates a figure of merit for all the threads by scanning the instruction or data cache line by line. If the thread scheduler determines that the thread selected is unavailable, i.e., blocked, then the thread scheduler will select another thread based on the figure of merit.

One useful figure of merit is that of ownership. A thread is said to own a line if it is the last thread to have used a line. The figure of merit for a particular thread can be one of the following measures: (1) the number of data lines "owned" by a thread, (2) the number of data lines brought into a cache by a thread over some interval of time, (3) the number of accesses to a cache by a thread, (4) the number of hits for a thread over a given time interval, or (5) any other information received from the instruction cache 16 and/or the data cache 26 that relates to a particular thread. In general, the thread having the largest figure of merit is selected when a thread swapping event occurs. The thread is selected by the thread scheduler 20 outputting an enable signal 30, corresponding to a particular register file 14.

The thread having the largest figure of merit is usually selected because this thread is using the processor's resources more efficiently than threads having smaller figure of merit. The figure of merit improves the efficiency of thread scheduling by providing the multi-thread processor with feedback on the current execution environment as measured by the cache memory. In particular, the figure of merit for a particular thread n provides the processor 12 with feedback as to how efficient the instruction cache 16 and/or the data cache 26 are processing information.

Once the thread scheduler 20 has enabled a thread to execute, the address located in the PC of the enabled thread is sent to the instruction cache 16. The process of selecting another thread to execute is repeated using the system and method of the present invention.

Figure 2:
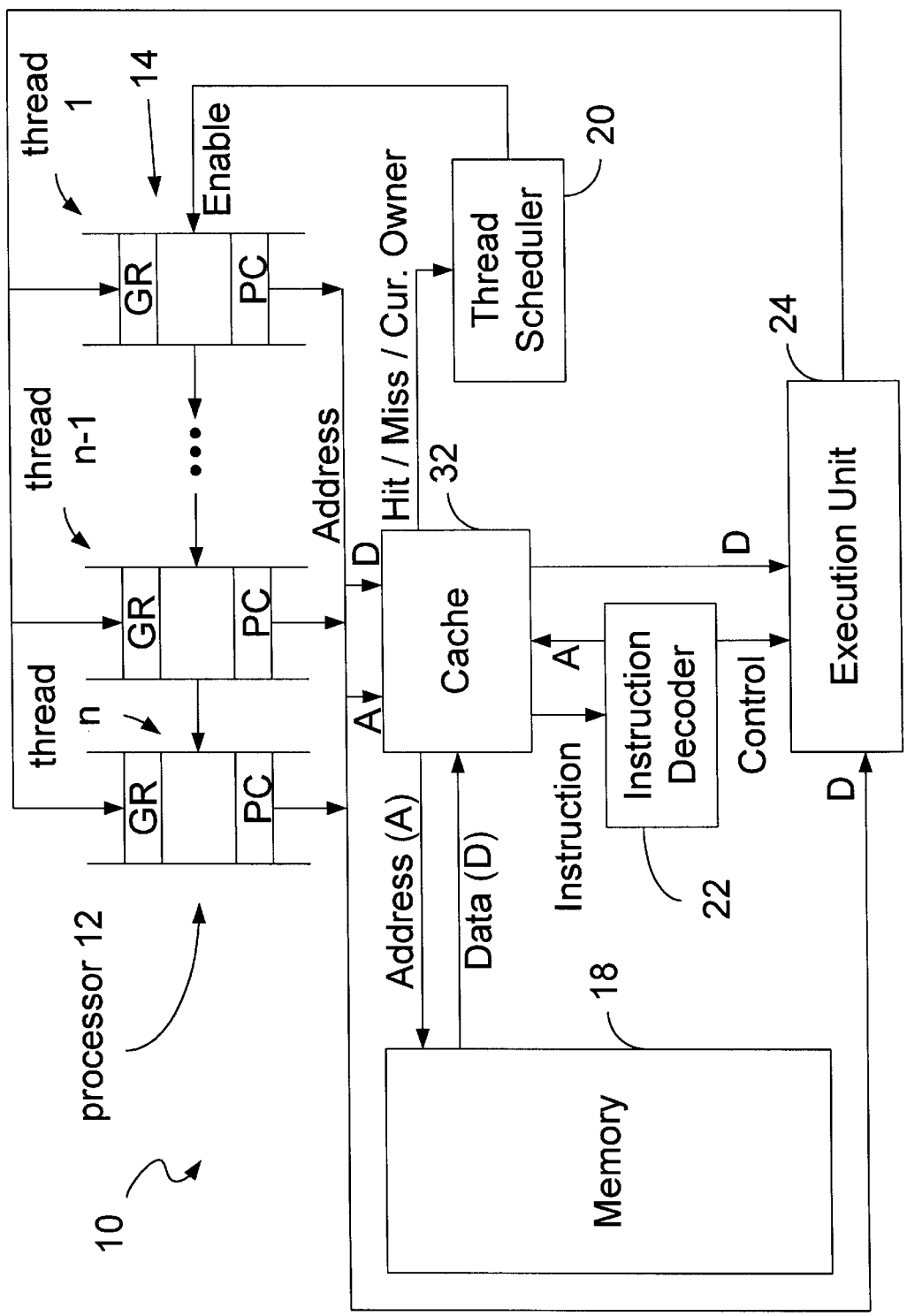
FIG. 2 is a block diagram of a multi-thread processing system having a single cache for both instructions and data.

FIG. 2 is a block diagram of a multi-thread processoring system having a single cache 32 for both instructions and data. The operations of the combined instruction and data cache 32 are similar to the operations described for the instruction cache 16 and data cache 26 of FIG. 1. One of ordinary skill in the art will know how to implement the combined instruction and data cache from the description provided for the present invention.

Figure 3:
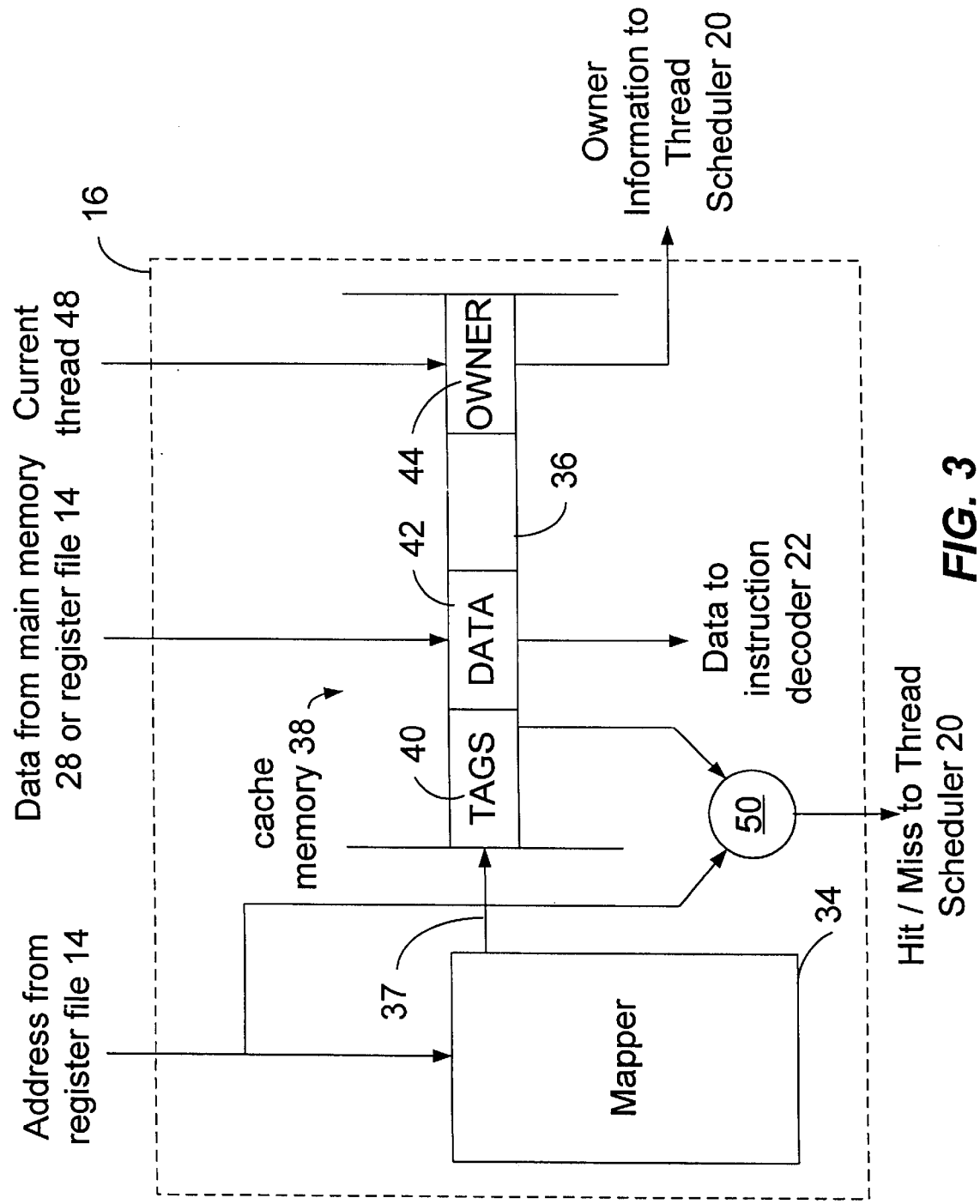
FIG. 3 is a block diagram of the instruction cache shown in FIG. 1.

FIG. 3 is a block diagram of the instruction cache shown in FIG. 1. The instruction cache 16 includes a mapper 34, a cache memory 38, and a tag comparator 50. The mapper receives the address information corresponding to the desired line from the register file 14 and converts this address into an index 37 into the cache memory 38. For simplicity, the embodiment described here is that of a direct mapped cache. Set associative caches can also be used. The output from the mapper selects the desired line 36. Arbitrary mappings may be implemented by the mapper.

The desired line, contains tag information 40, the actual data 42 corresponding to the memory location contained in the desired line, and ownership information 44. The mapping implemented by the mapper is in general many-to-one meaning that many main memory addresses can map to a given cache memory index. The tag information is used by the tag comparator 50 to specify exactly which address is contained in the line. If the tag information specifies that the wrong address is selected by the cache index 37, then a cache miss occurs and a cache miss signal is sent to the thread scheduler 20.

The owner information 44 specifies which thread, e.g., 1, owns this particular line. In addition, the owner column can store information such as the thread number that requested the data or any other information (listed above) used by the thread scheduler 20 to determine a figure of merit for a thread.

In one embodiment, the owner of a line is sent to the thread scheduler 20 along with the output of the tag comparator 50. For example, if the selected line is owned by thread 1 and the current thread is thread 2, then using figure of merit (1) from above, on a cache hit, the thread scheduler would increase the figure of merit of thread 2 (because it hit) and decrease the figure of merit for thread 1 (because now it doesn't own the line anymore). If the line had been owned by thread 2 already, then there would be no change to the figure of merit for any thread.

Figure 4:
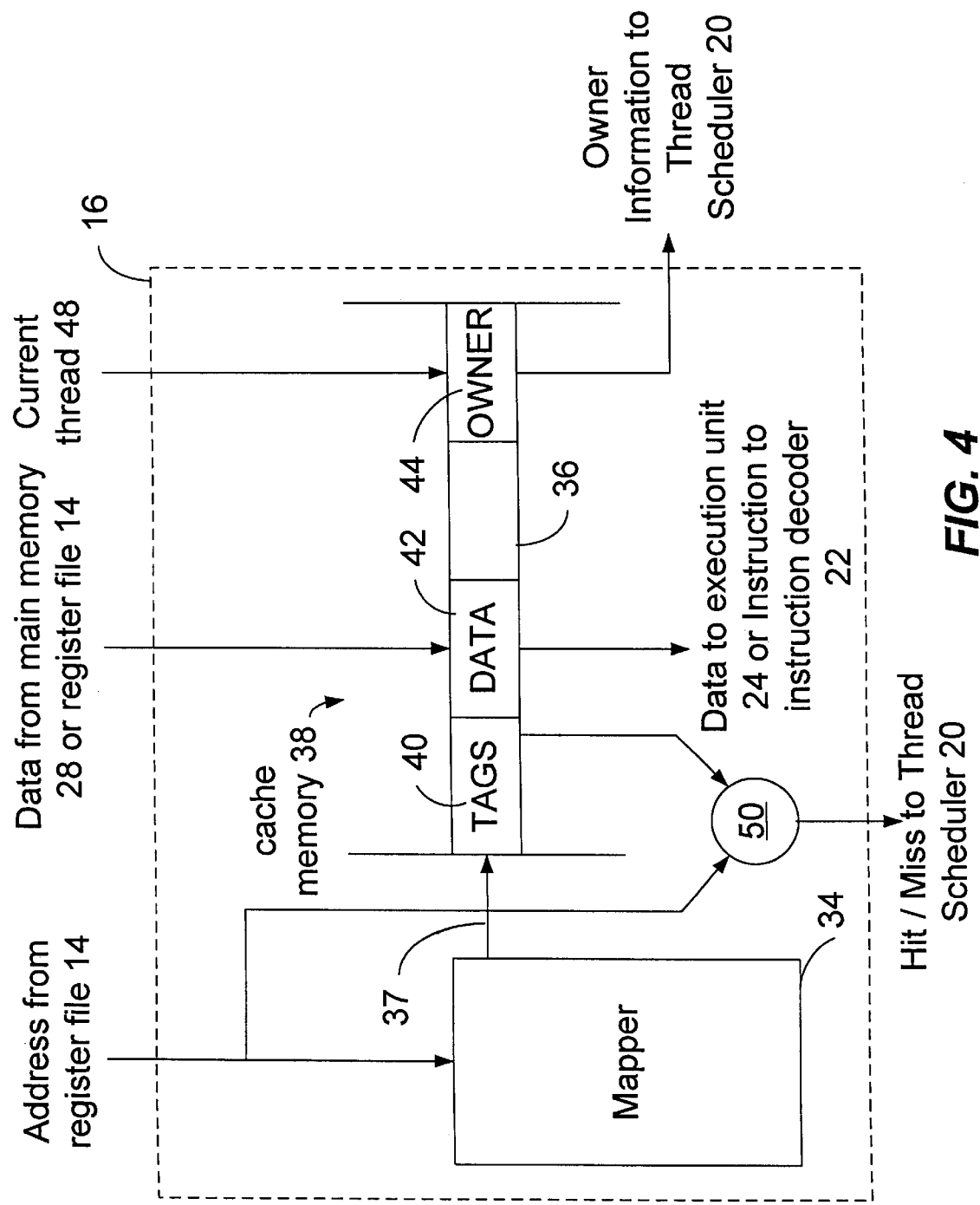
FIG. 4 is a block diagram of the data cache of FIG. 1 which operates in a manner similar to the instruction cache, as described and shown in FIG. 3.

FIG. 4 is a block diagram of the data cache 26 of FIG. 1 which operates in a manner similar to the instruction cache 16, as described above and shown in FIG. 3. One of ordinary skill in the art will know how to implement the data cache from the description provided for the present invention.

Figure 5:
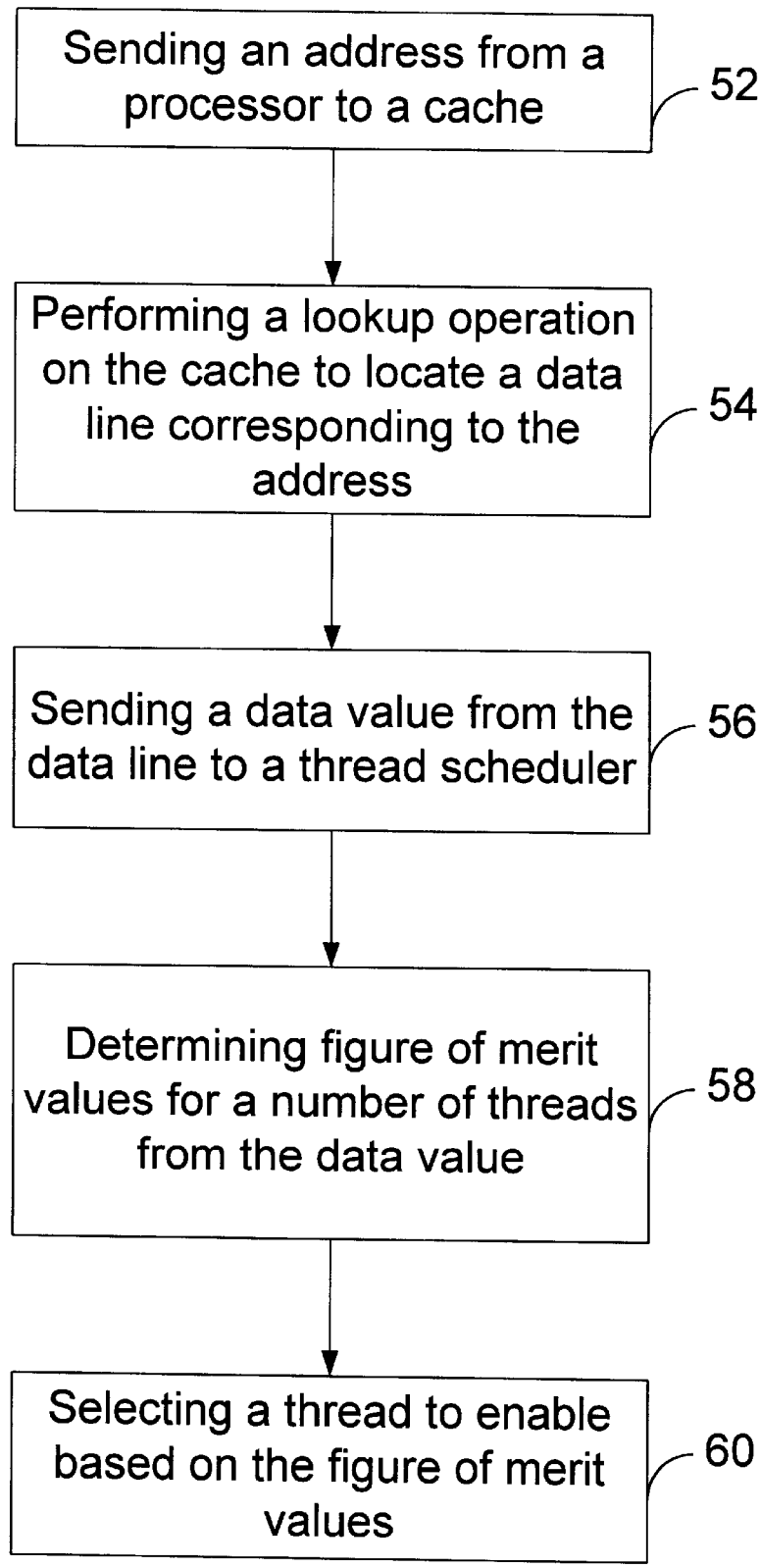
FIG. 5 is a flowchart depicting the method for scheduling threads in the multi-thread processing system of the present invention.

FIG. 5 is a flowchart depicting the method for scheduling threads in the multi-thread processor system of the present invention. The method for scheduling threads will be described making specific references to components shown in FIGS. 1 and 2.

In an initial step 52, the register file 14 issues an address to a cache memory, e.g., instruction cache 16, for a desired data line. The desired data line may contain instructions or data or instructions and data depending upon whether the cache memory is an instruction cache 16, a data cache 26, or a single instruction/data cache 32.

At step 54, a cache search or lookup operation is performed to access the desired data line from the cache memory. If the desired data line is not stored in the cache memory then the cache lookup operation causes a cache miss and a cache miss signal is sent to the thread scheduler 20. A similar lookup operation for the desired data line is performed on the main memory 18. Once the data line is located, the cache memory, e.g., instruction cache 16, receives the data line from the main memory. If the desired data line is stored in the cache memory then the cache lookup operation causes a cache hit and a cache hit signal is sent to the thread scheduler.

Thereafter, the cache memory sends the instruction to the instruction decoder 22. The instruction decoder reads the instruction and sends control information to the execution unit 24. The control information may include information as to where to find a particular piece of data or what operation, e.g. addition, subtraction, etc., to perform on the data. The cache memory might also send data from the data line and trigger information, e.g., a cache miss signal, to the thread scheduler 20, at step 56.

If the thread scheduler 20 receives a cache miss signal then the thread scheduler determines a figure of merit for the threads from the information received from the instruction cache 16 and/or the data cache 26, at step 58. Otherwise, a cache hit occurs and the access of the desired data line continues.

At step 60, the thread scheduler 20 enables a thread based on the figure of merit if a cache miss has occurred. In general, the thread having the largest figure of merit is usually selected because this thread is using the processor's resources more efficiently than threads having smaller figure of merit. The thread scheduler can also enable a thread based on which threads are currently ready to perform additional tasks, i.e., not blocked.

The multi-thread processing system of the present invention provides an efficient system and related method for increasing the processing speed of a multi-thread processor. This system and method provides the multi-thread processor with information on the current execution environment as measured by the cache memory. The speed at which data can be retrieved from the cache memory is important to the overall performance of the processor because when the efficiency of the cache memory is increased, the efficiency of the processor is also increased.

The foregoing detailed description of the present invention is provided for the purposes of illustration and is not intended to be exhaustive or to limit the invention to the precise embodiment disclosed. Accordingly, the scope of the present invention is defined by the following claims.

What is claimed is:

1. In a computer system comprising a multi-thread processor, a main memory, a cache memory, and a thread scheduler, a method of scheduling the execution of reads in the multi-thread processor, the method comprising:

transmitting from the multi-thread processor to the cache memory an address that identifies a data line to be retrieved;

performing a lookup operation in the cache memory for the address, wherein if performing the lookup operation in the cache memory does not locate the address, then sending a cache miss signal and ownership information to the thread scheduler, forming a lookup operation in the main memory for the address, transmitting the data line corresponding to the address from the main memory to the cache memory, and retrieving the data line corresponding to the address;

and wherein if performing the lookup operation in the cache memory does locate the address, then sending a cache hit signal and ownership information to the thread scheduler, and retrieving the data line corresponding to the address;

updating a figure of merit from the data line information for each thread of a plurality of threads, wherein the figure of merit is selected from the group consisting of the number of data lines owned by a thread, the number of data lines brought into the cache by a thread over a defined time interval, the number of accesses to the cache by a thread, the number of hits for a thread over a defined time interval, and the number of data lines hit by threads other than the thread that brought the data lines into the cache over a given time interval; and if a cache miss occurred, transmitting a signal to the multi-thread processor to enable a thread based on the figures of merit of the plurality of threads.

2. The method of claim 1, further comprising determining whether the thread is ready to perform a task.

3. The method of claim 1, further comprising determining a thread having the largest figure of merit.

4. The method of claim 1, wherein the data line information includes owner information.

5. The method of claim 4, wherein the owner information is selected from a group consisting of the thread number that brought the data line into the cache memory, the thread number that owns the data line, and the thread number that last processed the data line.

6. The method of claim 1, wherein transmitting a signal includes determining the thread having the smallest figure of merit.

7. In a computer system comprising a multi-thread processor, a cache, and a thread scheduler, a method of determining which thread to execute in the multi-thread processor, the method comprising:

transmitting from the multi-thread processor to the cache an address that identifies a data line to be retrieved;

performing a lookup operation on the cache to locate the address;

retrieving from the cache the data line corresponding to the address;

sending a cache signal and a data value from the data line to the thread scheduler; and determining a figure of merit from the data value for each of a plurality of threads;

wherein the figure of merit is selected from the group consisting of the number of data lines owned by a thread, the number of data lines brought into the cache by a thread over a defined time interval, the number of accesses to the cache by a thread, the number of data lines last processed by the data cache for a thread over a predetermined interval, the number of hits for a thread over a given time interval, and the number of data lines hit by threads other than the thread that brought the data lines into the cache over a given time interval.

8. The method of claim 7, further comprising enabling a thread based on the figures of merit.

9. The method of claim 7, wherein the data value is the number of data lines owned by a thread.

10. The method of claim 7, wherein the data value is the number of data lines brought into the primary cache by a thread over a predetermined interval of time.

11. The method of claim 7, further comprising enabling a thread having the largest figure of merit.

12. The method of claim 7, further comprising enabling the thread having the smallest figure of merit.

13. A multi-thread processing system comprising:

a multi-thread processor;

an instruction cache connected to the multi-thread processor, for storing instructions;

an instruction decoder connected to the instruction cache, for reading the instructions;

a data cache connected to the processor, for storing data;

an execution unit connected to the instruction decoder, for executing the instructions; and a thread scheduler connected to the instruction cache and data cache, for determining a figure of merit for each thread of a plurality of threads using the data, the thread scheduler configured to select a thread to execute based on the figure of merit, wherein the figure of merit is selected from the group consisting of the number of data lines owned by a thread, the number of data lines brought into the cache by a thread over a defined time interval, the number of data lines last processed by the data cache for a thread over a predetermined interval, the number of hits for a thread over a given time interval, and the number of data lines hit by threads other than the thread that brought the data lines into the cache over a given time interval.

14. The system of claim 13, wherein the thread scheduler selects the thread having the smallest figure of merit.

15. The system of claim 13, wherein the thread scheduler selects the thread having the largest figure of merit.

16. The system of claim 13, wherein the thread scheduler stores the figure of merit for the plurality of threads.

17. The system of claim 16, wherein the thread scheduler increases or decreases the figure of merit for a particular thread based on the information received from the instruction cache.

18. The system of claim 16, wherein the thread scheduler increases or decreases the figure of merit for a particular thread based on the information received from the data cache.

19. The system of claim 13, wherein the thread scheduler includes a memory for storing the figure of merit.

20. In a computer system comprising a multi-thread processor, a main memory, a cache memory, and a thread scheduler, a method of scheduling the execution of threads in the multi-thread processor, the method comprising:

transmitting from the multi-thread processor to the cache memory an address that identifies a data line to be retrieved;

performing a lookup operation in the cache memory for the address, wherein if performing the lookup operation in the cache memory does not locate the address, then sending a cache miss signal and ownership information to the thread scheduler, forming a lookup operation in the main memory for the address, transmitting the data line corresponding to the address from the main memory to the cache memory, and retrieving the data line corresponding to the address;

and wherein if performing the lookup operation in the cache memory does locate the address, then sending a cache hit signal and ownership information to the thread scheduler, and retrieving the data line corresponding to the address;

updating a figure of merit from the data line information for each thread of a plurality of threads, wherein the figure of merit is selected from the group consisting of the number of data lines owned by a thread, the number of data lines brought into the cache by a thread over a defined time interval, the number of accesses to the cache by a thread, and the number of hits for a thread over a defined time interval; and if a cache miss occurred, transmitting a signal to the multi-thread processor to enable a thread based on the figures of merit of the plurality of threads.

21. In a computer system comprising a multi-thread processor, a cache, and a thread scheduler, a method of determining which thread to execute in the multi-tread processor, the method comprising:

transmitting from the multi-thread processor to the cache an address that identifies a data line to be retrieved;

performing a lookup operation on the cache to locate the address;

retrieving from the cache the data line corresponding to the address;

sending a cache signal and a data value from the data line to the thread scheduler; and determining a figure of merit from the data value for each of a plurality of threads;

wherein the figure of merit is selected from the group consisting of the number of data lines owned by a thread, the number of data lines brought into the cache by a thread over a defined time interval, the number of accesses to the cache by a thread, the number of data lines last processed by the data cache for a thread over a predetermined interval, and the number of hits for a thread over a given time interval.

22. A multi-thread processing system comprising:

a multi-thread processor;

an instruction cache connected to the multi-thread processor, for storing instructions;

an instruction decoder connected to the instruction cache, for reading the instructions;

a data cache connected to the processor, for storing data;

an execution unit connected to the instruction decoder, for executing the instructions; and a thread scheduler connected to the instruction cache and data cache, for determining a figure of merit for each thread of a plurality of threads using the data, the thread scheduler configured to select a thread to execute based on the figure of merit, wherein the figure of merit is selected from the group consisting of the number of data lines owned by a thread, the number of data lines brought into the cache by a thread over a defined time interval, the number of data lines last processed by the data cache for a thread over a predetermined interval, and the number of hits for a thread over a given time interval.

* * * * *